United States Patent
Ben-Abdallah et al.

(10) Patent No.: US 9,798,218 B2
(45) Date of Patent: Oct. 24, 2017

(54) SWITCHABLE DIRECTIONAL INFRARED RADIATION SOURCE

(71) Applicants: CENTRE NATIONAL DE LA RECHERCHE SCIENTIFIQUE, Paris (FR); INSTITUT D'OPTIQUE GRADUATE SCHOOL, Palaiseau (FR); UNIVERSITE PARIS-SUD, Orsay (FR)

(72) Inventors: Philippe Ben-Abdallah, Vieille Eglise en Yvelines (FR); Anne-Lise Coutrot, Paris (FR); Mondher Besbes, Les Ulis (FR); Henri Benisty, Palaiseau (FR)

(73) Assignees: Centre National De La Recherche Scientifique, Paris (FR); Institut D'Optique Graduate School, Palaiseau (FR); Universite Paris SUD, Orsay (FR)

( * ) Notice: Subject to any disclaimer, the term of this patent is extended or adjusted under 35 U.S.C. 154(b) by 0 days.

(21) Appl. No.: 14/648,231

(22) PCT Filed: Nov. 27, 2013

(86) PCT No.: PCT/EP2013/074830
§ 371 (c)(1),
(2) Date: May 28, 2015

(87) PCT Pub. No.: WO2014/083041
PCT Pub. Date: Jun. 5, 2014

(65) Prior Publication Data
US 2015/0293428 A1    Oct. 15, 2015

(30) Foreign Application Priority Data
Nov. 30, 2012    (FR) ..................... 12 61498

(51) Int. Cl.
G02B 27/42    (2006.01)
G02F 1/29    (2006.01)
(Continued)

(52) U.S. Cl.
CPC ........... *G02F 1/292* (2013.01); *G02B 5/1828* (2013.01); *G02B 27/42* (2013.01); *G02F 1/0147* (2013.01); *G02F 1/29* (2013.01); *G02F 2203/11* (2013.01)

(58) Field of Classification Search
CPC .......... G02F 1/292; G02F 1/0147; G02F 1/29; G02F 2203/11; G02F 2203/20; G02F 2203/22; G02F 2203/50; G02B 5/1828
(Continued)

(56) References Cited

U.S. PATENT DOCUMENTS 6,819,463 B2 *  11/2004  Noonan .................... G02F 1/21
                                                        359/245
6,906,842 B2 *   6/2005  Agrawal ............... G02F 1/1523
                                                        359/265
(Continued)

FOREIGN PATENT DOCUMENTS

FR        2 857 458 A1    1/2005

OTHER PUBLICATIONS

Rémi Carminati et al., "Near-Field Effects in Spatial Coherence of Thermal Sources," Physical Review Letters, vol. 82, No. 8, Feb. 22, 1999, pp. 1660-1663.
(Continued)

*Primary Examiner* — Brooke Purinton
(74) *Attorney, Agent, or Firm* — Baker Hostetler LLP

(57) ABSTRACT

A source of directional radiation in an IR band comprises at least a substrate and an external layer comprising controllable cells made of a metal insulator transition material that changes phase depending on its temperature relative to a
(Continued)

temperature at which the corresponding wavelength is located in the IR band and that possesses a crystalline phase and an amorphous phase, and control means for controlling the phase change of the cells so as to form in this external layer a diffraction grating when the cells are controlled to the amorphous phase, in order thus to obtain a switchable directional source.

12 Claims, 4 Drawing Sheets

(51) Int. Cl.
*G02B 5/18* (2006.01)
*G02F 1/01* (2006.01)

(58) Field of Classification Search
USPC ........ 359/238, 240, 245, 279, 315, 316, 321
See application file for complete search history.

(56) References Cited

U.S. PATENT DOCUMENTS

| | | | |
|---|---|---|---|
| 7,267,866 B2* | 9/2007 | Mase | B64G 1/503 236/1 R |
| 8,259,381 B2* | 9/2012 | Kaye | G02F 1/0147 359/279 |
| 8,655,189 B2* | 2/2014 | Almassy | G02F 1/19 359/288 |
| 2001/0007549 A1* | 7/2001 | Maeda | G02B 5/1828 369/112.05 |
| 2004/0005472 A1* | 1/2004 | Arnaud | C03C 17/3417 428/472 |
| 2004/0100343 A1 | 5/2004 | Tsu et al. | |
| 2006/0186357 A1 | 8/2006 | Celanovic et al. | |
| 2007/0179239 A1* | 8/2007 | Li | G02B 5/22 524/497 |
| 2009/0217977 A1 | 9/2009 | Florescu et al. | |
| 2013/0078587 A1* | 3/2013 | Christopher | G02B 6/25 432/1 |

OTHER PUBLICATIONS

Andrei V. Shchegrov et al., "Near-Field Spectral Effects due to Electromagnetic Surface Excitations," Physical Review Letters, vol. 85, No. 7, Aug. 14, 2000, pp. 1548-1551.

Jean-Jacques Greffet et al., "Coherent Emission of Light by Thermal Sources," Letters to Nature, vol. 416, Mar. 7, 2002, pp. 61-64.

O.G. Kollyukh et al., "Thermal Radiation of Plane-Parallel Semi-transparent Layers," Optics Communications 225, 2003, pp. 349-352.

Philippe Ben-Abdallah, "Thermal Antenna Behavior for Thin-Film Structures," Journal of Optical Society of America, vol. 21, No. 7, Jul. 2004, pp. 1368-1371.

Ivan Celanovic et al., "Resonant-Cavity Enhanced Thermal Emission," Physical Review B 72, 2005, pp. 075127-1-075127-6.

B.J. Lee et al., "Coherent Thermal Emission from One-Dimensional Photonic Crystals," Applied Physics Letters, 87, 2005, pp. 071904-1-071904-3.

Jérémie Drevillon et al., "Ab Initio Design of Coherent Thermal Sources," Journal of Applied Physics, 102, 2007, pp. 114305-1-114305-8.

A. Battula et al., "Monochromatic Polarized Coherent Emitter Enhanced by Surface Plasmons and a Cavity Resonance," Physical Review B 74, 2006, pp. 245407-1-245407-7.

Karl Joulain et al., "Coherent Thermal Emission by Microstructured Waveguides," Journal of Quantitative Spectroscopy & Radiative Transfer 104, 2007, pp. 208-216.

Stefan Enoch et al., "A Metamaterial for Directive Emission," Physical Review Letters, vol. 89, No. 21, Nov. 18, 2002, pp. 213902-1-213902-4.

Shuang Zhang et al., "Experimental Demonstration of Near-Infrared Negative-Index Metamaterials," Physical Review Letters, 95, 2005, 137404-1-137404-4.

F.M. Wang et al., "Metamaterial of Rod Pairs Standing on Gold Plate and its Negative Refraction Property in the Far-Infrared Frequency Regime," Physical Review E 75, 2007, pp. 016604-1-016604-4.

Douglas Werner et al., "Adaptive Phase Change Metamaterials for Infrared Aperture Control," Proceedings of the SPIE—Unconventional Imaging, Wavefront Sensing, and Adaptive Coded Aperture Imaging and Non-Imaging Sensor Systems, vol. 8165, Aug. 21, 2011 pp. 81651H-1-81651H-9, XP002712476.

Mikhail Kats et al., "Ultra-Thin Perfect Absorber Employing a Tunable Phase Change Material," Applied Physics Letters, American Institute of Physics, vol. 101, No. 22, Nov. 26, 2012, pp. 221101-1-221101-5, XP012168114.

Yasuyuki Kaneko et al., "Manipulations of Thermal Emission by β-FeSi2 Thin Films and Nanostructures," Proceedings of the SPIE—Nanostructured Thin Films V, vol. 8465, Aug. 12, 2012, pp. 846516-1-846516-6, XP002712475.

* cited by examiner

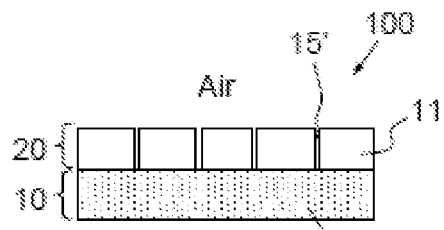
FIG.2a
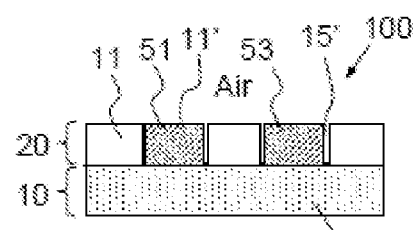
FIG.2b
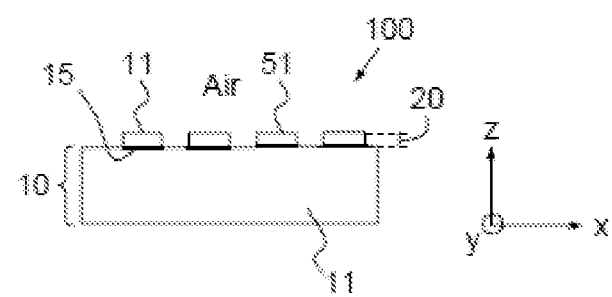
FIG.2c
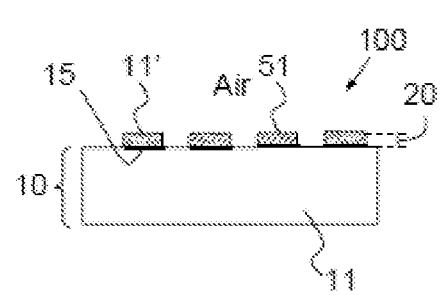
FIG.2d
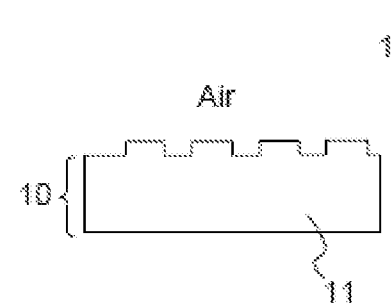
FIG.2e
FIG.2f
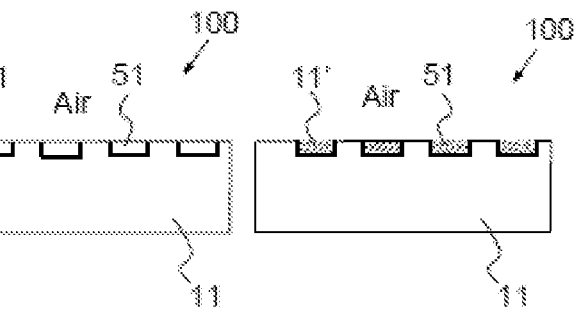
FIG.2g
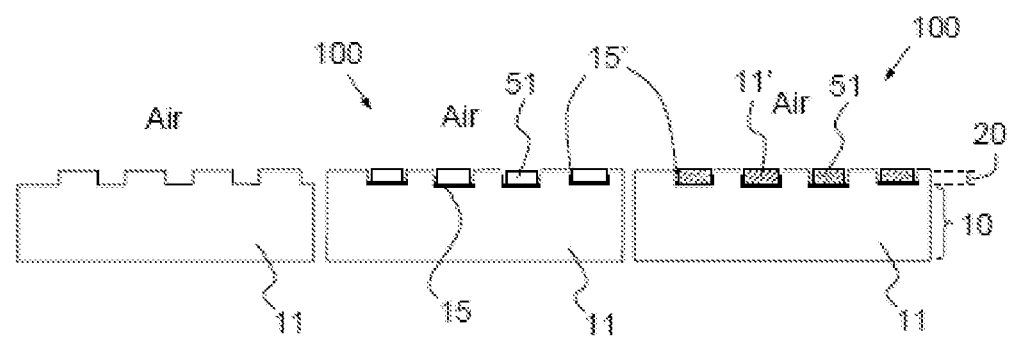
FIG.2h
FIG.2i
FIG.2j

SWITCHABLE DIRECTIONAL INFRARED RADIATION SOURCE

CROSS-REFERENCE TO RELATED APPLICATIONS

This application is a National Stage of International patent application PCT/EP2013/074830, filed on Nov. 27, 2013, which claims priority to foreign French patent application No. FR 1261498, filed on Nov. 30, 2012, the disclosures of which are incorporated by reference in their entirety.

FIELD OF THE INVENTION

The field of the invention is that of directional sources of infrared radiation.

BACKGROUND

The blackbody concept serves as a model for the far field emissive behavior of hot bodies. It will be recalled that according to Wien's law, the wavelength $\lambda_W$ of which a blackbody emits the most radiant light flux, which flux is here denoted I, is inversely proportional to temperature T° (expressed in ° K): $\lambda_W$=2898 (in µm ° K)/T°.

In the natural state, the far field emissive behavior of a solid hot body is most often very similar to that of a blackbody. Its emission is incoherent, i.e. it is isotropic (Lambertian) overall, and of broad spectral width.

Emissivity $\in(\lambda, \theta)$ relates the emission spectrum $I(\lambda, \theta)$ of a hot body at a wavelength $\lambda$ in the direction $\theta$ to the emission of a blackbody $I_0$, and is defined by the ratio:

$$\in(\lambda,\theta)=I(\lambda,\theta)/I_0(\lambda,T)$$

$I_0(\lambda,T)$ being the monochromatic radiant flux of a blackbody of temperature T at the wavelength $\lambda$ and $I(\lambda, \theta)$ that of the object at the same wavelength in the direction $\theta$.

Control of the emission direction is associated with the spatial coherence of the electromagnetic field. The longer the correlation length, the greater the directivity. Under these conditions, thermal sources may behave as veritable antennae. To date, many directional thermal sources have been designed by structuring materials at subwavelength scales.

In 1999 Carminati et al., then Shchegrov et al. (2000) demonstrated that the field associated with a resonant surface mode possesses a high spatial coherence. However, as this field remains confined to the vicinity of the interface, far field thermal emission remains incoherent.

In 2002, Greffet et al. (Greffet et al., 2002) demonstrated that it was possible to export the spatial coherence of these waves to the far field using a surface grating. The structure of such a source 100' is shown in FIG. 1: it consists of a bulk sample 50' of SiC, the surface of which has been etched to form a 1D grating. However, one of the weaknesses of this type of source resides in the drift in the emission direction with wavelength. In addition, a high directivity is observed only for the p polarization, the only polarization to which the resonant surface mode couples, the electric field of this polarization having no component along the surface. Thus, for the s polarization the radiation emitted remains incoherent.

To mitigate this drawback, Kollyukh et al. (2003), Ben-Abdallah (2004) and Celanovic et al. (2005) proposed to use single films or microcavities to exploit the presence of Fabry-Perot type guided modes and cavity modes to control the emission pattern simultaneously for both polarization states. Veritable thermal antennae, these structures nevertheless exhibit a low emissivity level.

Other more complex structures have been proposed to improve the degree of coherence of these sources. This is the case for the structures proposed by Lee et al. (2005). These sources, composed of a periodic one-dimensional multilayer structure (1D stack) coupled to a polar material, allow the direction and frequency of emission to be controlled simultaneously for both the s and p polarization states of light. However, the directional control of the emission of this type of planar source remains low.

To mitigate this problem, hybrid structures that associate a number of the features of the structures described above have been developed (Drevillon et al. 2007). Among these structures, mention may be made of that proposed by Battula & Chen (2006). It is here a question of nanostructured multilayer materials composed of a cavity placed between a surface grating and a 1D photonic crystal, i.e. a 1D surface grating. This structure allowed a source having a high spatial but also temporal coherence in the visible and near IR to be obtained. The long coherence length of this structure is attributed on the one hand to the excitation of evanescent waves on the surface of the grating. On the other hand, the photonic crystal acts as a polarizer and suppresses the emission of nonresonant s-polarized radiation that would not be directional, leaving the emissivity high only for the resonant component of the emission. Lastly, the high degree of temporal coherence (therefore the small width) is due to the presence of the cavity that surmounts the photonic crystal and that amplifies the emission at the frequency of the resonant modes.

Joulain & Loizeau (2007) have also demonstrated that it would be possible to obtain a temporally coherent directional thermal source by coupling a surface grating to a simple guide. However, this work relied on a theoretical approach and was limited to one-dimensional gratings.

It has also been envisioned to use metamaterials, artificial composite structures that exhibit a negative dielectric permittivity and a negative magnetic permeability, to control the direction of thermal emissions (Enoch, 2002). However, the absence of natural magnetic resonance in the infrared and difficulties with fabrication have slowed the development of these materials.

However, in 2005 a team of researchers (Zhang et al., 2005) demonstrated that it would be possible to design 3D metamaterials in the near infrared (2 µm) by combining perforated dielectric structures and metal films. An analogous result was also obtained in the far infrared (40 to 60 µm) using composite structures based on gold wire (Wang et al., 2007). In contrast to the structures proposed by Zhang et al. (2005), the optical behavior of which was based on a complex set of interferences between electromagnetic waves in these structures, it is the presence of stationary waves along the wires that allows a negative refractive index to be produced, including for the "s" polarization.

These various thermal sources are not switchable insofar as only a mechanical solution, such as a shutter for example, allows the emission of the entirety of the spectrum to be suppressed (or practically suppressed). The position of the emissions may also be shifted over the spectrum by changing the temperature of the source until the Wien wavelength λw departs so far from the range of interest that the emission weakens, this approach moreover having a high inertia. However, the emission mechanism is in no way suppressed.

Moreover, one solution commonly implemented to obtain a directional thermal source that is directionally modulable in its emission band consists in associating:

a weakly directional IR radiation source such as a wire, filament or strip; and a mechanical device allowing the radiation to be concentrated in a privileged direction, such as a parabolic or paraboloidal reflective surface for example, and the orientation of which may be varied. The use of glass optics is generally precluded in the mid-infrared and optics made of alternative materials (ZnSe, Ge, CsI) suitable for these wavelengths are expensive and fragile.

The switching (turning on/off) and modulation (change of the emission direction) functionalities obtained in this way have drawbacks in terms of inertia, when one operating state is changed to another, and also in terms of bulk: the optics (the reflective surface) must be much larger than the actual source in order to obtain sufficient directionality.

In summary, there exist directional thermal sources that are not switchable and switchable sources that are not modulable without external devices (shutters, reflectors) and that are moreover rather slow to switch.

Therefore, there remains to this day a need for a non-wire source of infrared radiation that simultaneously meets all of the aforementioned requirements, especially in terms of providing a satisfactory far-field emission level, in terms of directional control of the emissivity, in terms of ease of fabrication, in terms of switching in its emission band, and in terms of low bulk. The field of application where this need is present is notably that of infrared spectroscopy, but also that of heating in any context where a form of agility is required (food-processing, health, control of chemical processes, individual heating of a seated or standing individual, etc.).

SUMMARY OF THE INVENTION

The subject of the invention is a directional thermal source comprising a substrate bearing an external layer especially made of a metal insulator transition (MIT) material that possesses a crystalline phase and an amorphous phase that is in general the high-temperature phase. It operates in two different configurations:

non-emitting source (emissivity very low relative to that of a blackbody) when the material of the external layer is in its crystalline state; and high-emissivity directional source with an emission similar to that of a blackbody at the same temperature as the source, when the external layer is in a hybrid crystalline/amorphous state that then forms a diffraction grating.

The switch from one configuration to another occurs reversibly at the critical transition temperature Tc of the MIT material, the wavelength λc corresponding to this temperature Tc being in the emission range of the source; this switching is achieved electrically under the action of an optionally pulsed electrical current or indeed thermally under the action of heat sources arranged so as to define a field of variable temperature.

If necessary, an insulating layer prevents phase transitions in the MIT material in other regions of the source, especially those under the surface of the external layer.

More precisely, the subject of the invention is a source of directional radiation in an IR band, mainly characterized in that it comprises at least:

a substrate; and an external layer comprising controllable cells made of a metal insulator transition material that changes phase at a temperature Tc at which the corresponding wavelength is located in the IR band and that possesses a crystalline phase and an amorphous phase; and control means for controlling the phase change of the controllable cells so as to form in this external layer a diffraction grating when the cells are controlled to the amorphous phase Thus, a directional source that is switchable depending on its temperature relative to Tc is obtained. Thus, by varying the temperature only for a thin exterior film, and for a minimal change in temperature, the same effect as that obtained by switching the thermal power provided to the source on/off is obtained. It is thus advantageously possible to obtain a switchable infrared source.

The diffraction grating is advantageously periodic.

According to one feature of the invention, the control means are electrical and optionally comprise a generator of electrical pulses.

The control means may be able to control groups of cells, each group comprising a variable number of cells.

Preferably, the source comprises means for supervising the control means, which means are configured to modify the spatial characteristics of the grating, and thus to obtain a switchable directional source the emission direction of which may be modulated.

The substrate chosen is advantageously made of a material able to support a surface mode. It may be made of the same material as that of the external layer.

According to another feature of the invention, the external layer comprises a uniform external underlayer made of said metal insulator transition material and a subjacent underlayer of spatially variable thermal conductivity intended to form said cells in the external underlayer depending on the spatial variation; the control means for collectively controlling the cells consist of a single thermal or electrical control that results in modulated thermal heating through the intervention of the underlayer of spatially variable thermal conductivity. The formation of the grating is spontaneously and collectively ensured by the structure of this underlayer of spatially variable thermal conductivity.

The metal insulator transition material belongs to the group consisting of vanadium oxides or barium titanates or even lanthanum perovskites.

BRIEF DESCRIPTION OF THE DRAWINGS

Other features and advantages of the invention will become apparent on reading the following detailed description, given by way of nonlimiting example and with reference to the appended drawings in which:

FIGS. 2a to 2j schematically show cross sections through example switchable directional radiation source structures according to a first electrically controlled embodiment of the invention;

Figure 4A:
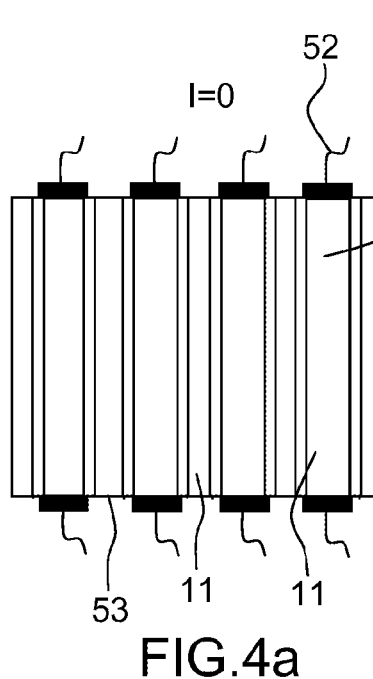
FIGS. 4a to 4c schematically show example switchable directional radiation source structures as seen from above, namely.
Figure 4B:
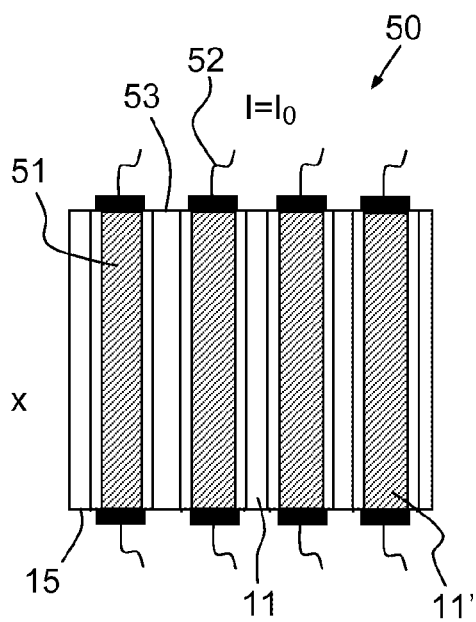
Figure 4C:
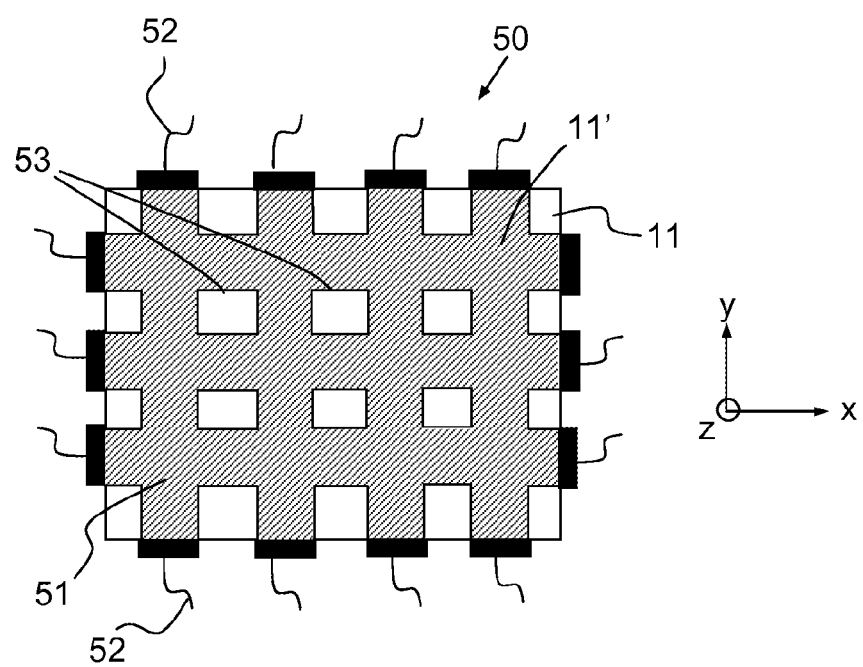
Figure 5A:
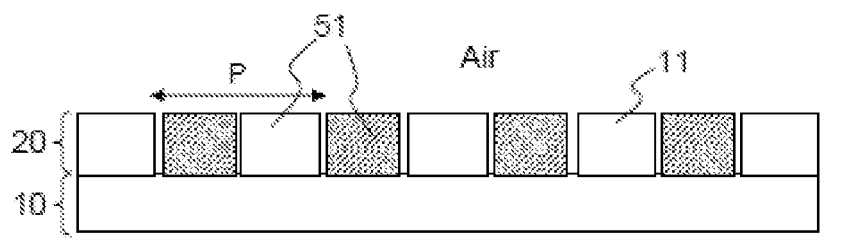
Figure 5B:
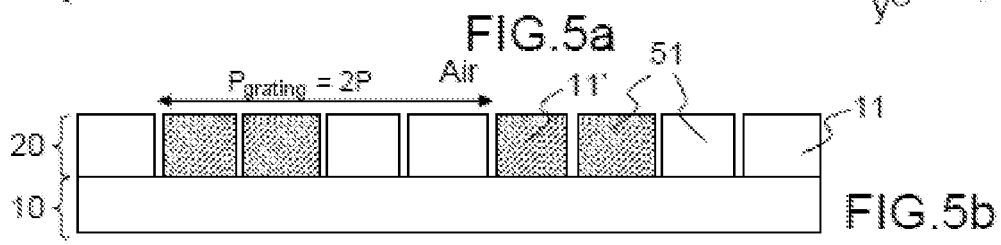
Figure 5C:
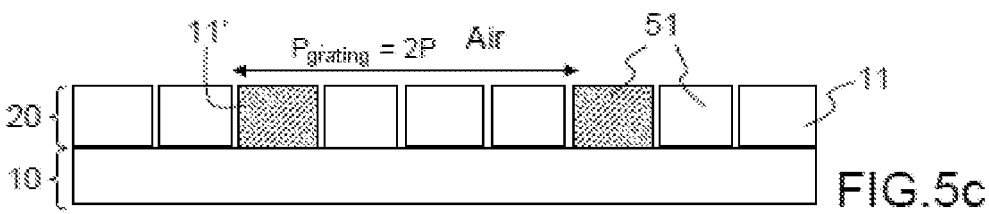
Figure 5D:
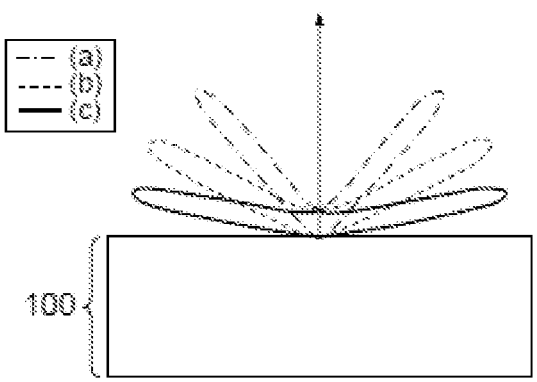
Figure 6:
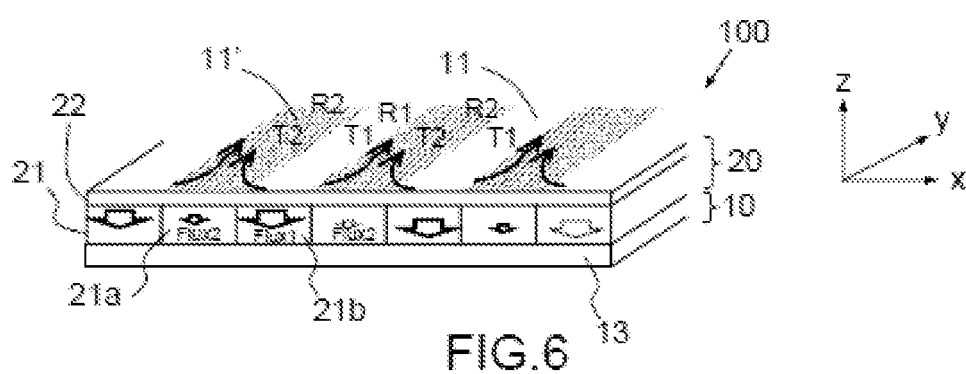

a 1D periodic grating in the xy plane of the layers, without the diffraction grating activated (FIG. 4a) and with the diffraction grating activated (FIG. 4b); and a 2D periodic grating in the xy plane of the layers with the diffraction grating activated (FIG. 4c);

FIGS. 5a to 5d schematically show example switchable directional radiation source structures the emission direction of which is modulated depending on the period of the diffraction grating (FIGS. 5a to 5c), and the corresponding emission directions (FIG. 5d), in cross section; and FIG. 6 schematically shows a perspective view of an example switchable directional radiation source structure according to another thermally controlled embodiment of the invention.

From one figure to another, the same elements have been designated by the same references.

DETAILED DESCRIPTION

With regard to FIGS. 2a to 2j, a switchable radiation source 100 that is directional in an IR band comprised in the 1 μm to 20 μm band and according to the invention will be described.

In its structure, this source 100 comprises at least:

a substrate 10 providing a function of ensuring a temperature near the critical temperature of the MIT, and a function as a primary source of radiation, in said IR band, centered on the Wien wavelength of the material from which it is made, the width of the band being given by Planck's law; and an external layer 20 intended to direct the radiation.

The external layer 20 comprises controllable cells 51 made of a metal insulator transition (MIT) material; the phase transition occurs when the temperature passes the critical temperature Tc, the wavelength λc (referred to as the transition wavelength) corresponding to the critical temperature Tc being located in the IR band of the source. The MIT possesses a crystalline and therefore insulating phase referenced 11, and an amorphous phase, which is electrically and thermally conductive because it is metallic, referenced 11'. These cells 51 are associated with an electrical or thermal means for controlling their temperature change and therefore their phase change, shown in FIGS. 4 and 6.

According to a first embodiment, the cells are formed in the following way. Reference is made to FIGS. 2a to 2j.

The substrate 10 is composed of a material 12 ensuring radiation is emitted in an IR band centered on the Wien wavelength of the material. It is for example a question of an MIT material such as $VO_2$, $LaCrO_3$ or a non-MIT material such as SiC, Si or $Si_3N_4$, the thickness of which is comparable to or larger than the thermal wavelength, as shown in FIGS. 2a and 2b. The material chosen depends on the wavelength at which the source must operate.

According to one alternative, the substrate may be made of the same MIT material as that of the external layer, as shown in FIGS. 2c to 2j, but be intended to remain in its crystalline state 11. For this purpose, an electrically and thermally insulating layer 15, of $SiO_2$ or silicon nitride for example, typically from 10 nm to 50 nm in thickness, is deposited on the substrate 11 by chemical deposition (CVD, PECVD, etc.) before the external MIT layer 20 is deposited and over the entire surface of the substrate, then etched as shown in FIG. 2c in order to prevent, in operation, the higher temperature associated with the amorphous state 11' of the cells shown in FIG. 2b from being transmitted to the substrate 11.

An MIT layer of about 2 μm in thickness is deposited on the substrate 10 or on the insulating layer by cathode sputtering or PLD. This MIT is typically:

$LaCrO_3$ with a Tc=530° K corresponding to a λc≈5.5 μm; or $BaTiO_3$ with a Tc=393° K corresponding to a λc≈7.4 μm; or $VO_2$ with a Tc=340° K corresponding to a λc≈8.5 μm; or $V_2O_3$ with a Tc=160° K corresponding to a λc≈18 μm.

Figure 1:
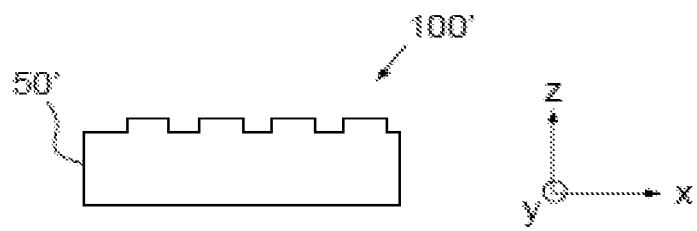
FIG. 1, described above, schematically shows an example IR radiation source according to the prior art.
Figure 3A:
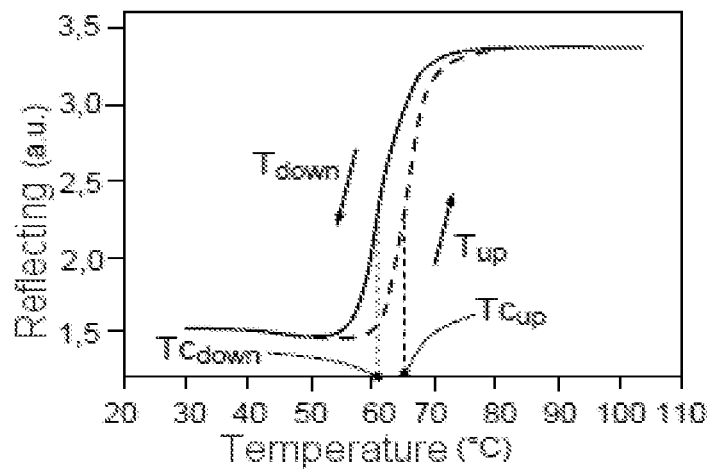
FIG. 3a illustrates the hysteresis cycle of the reflectivity at 1550 nm for a $VO_2$ material as a function of temperature.

The MIT material chosen is preferably a material the transition wavelength λc of which is closest to the Wien wavelength of the substrate 10. More specifically Tc (and therefore λc) is an average transition temperature (wavelength, respectively) because the transition exhibits a hysteresis cycle as illustrated in FIG. 3a for a 75 nm-thick sample of $VO_2$ deposited on a C-plane sapphire substrate, in this case of $Al_2O_3$; Tc is the average of $Tc_{down}$ and $Tc_{up}$.

This MIT film is patterned with grooves, for example by optical lithography, e-beam lithography, reactive ion etching or nanoimprint lithography, so as to form furrows as shown in FIGS. 2a to 2j. Thus, cells 51, 53 taking the form of furrows that are electrically and thermally insulated from each other by air 15' are obtained as may be seen in FIGS. 2a, 2b, 2i and 2j. Typically furrows that are about 2 μm wide and about 200 nm deep are produced. This width advantageously enables emission in the range considered, one cell in two being switched, or enables collective switching of n adjacent cells in m, n and m being low numbers <10. The grooves may of course be formed in another direction in order then to obtain circular cells, cells forming a chequerboard pattern, inter alia.

According to another alternative, furrows are formed directly on the substrate 11 as shown in FIGS. 2e and 2h. These furrows are coated with insulator 15 (on their walls and bottom) as shown in FIG. 2f, then the MIT material 11 is deposited in these furrows as shown in FIG. 2g. According to one variant, a layer of insulator 15 is deposited in the bottom of the furrows but not on the walls, then the MIT 11 is deposited in the furrows, and grooves are formed in order to ensure an insulating air gap 15' between the walls of the furrows and the MIT 11, as shown in FIGS. 2i and 2j.

Among these cells, certain (or all) are associated with control means for controlling their phase transition and then become controllable cells 51, the remaining cells 53 being uncontrollable. When the source is in a hybrid configuration forming a certain sequence of crystalline/amorphous states, i.e. when certain of the cells are in their amorphous state, said cells form a diffraction grating 50, as shown in FIGS. 2b, 2j, 4b and 4c, that modifies the emission pattern of the field existing at the substrate/external MIT layer interface.

This grating 50 is preferably periodic, one- or two-dimensional in the plane (xy) of the layer, and for example circular or chequered; it will be recalled that the period P of the grating is related to Wien wavelength by the relationship $P \sim \lambda_W/(2n)$, n being the refractive index of the medium. However, these cells could form an aperiodic diffraction grating the emission directions of which would then not have two-fold, four-fold or six-fold orientational symmetry (invariant in rotation by 2pi/2, 2pi/4 and 2pi/6). Quasi-crystalline or Penrose-type tilings are examples of such gratings. Blazed gratings would also allow the azimuthal symmetry of the emission to be broken.

Figure 3B:
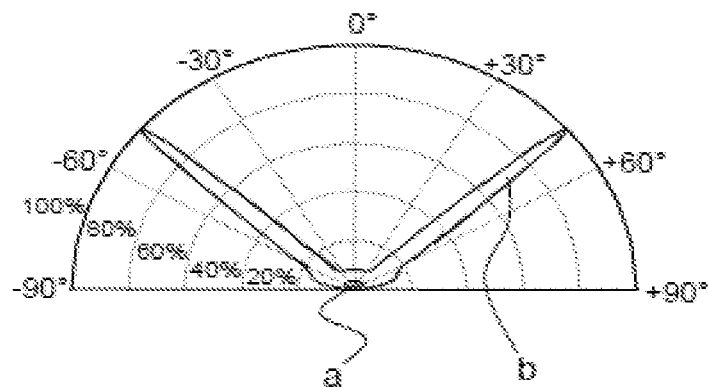
FIG. 3b shows the thermal emission as a function of direction, expressed in % relative to that of a blackbody (it is therefore emissivity e that is plotted), for an example thermal source according to the invention emitting at 8.5 µm.

In the case of an MIT substrate, the latter supports, at its interface with the external layer 20, a surface mode also referred to as a surface polariton, and hence its far-field emission is weak. When the external layer 20 is in its hybrid crystalline/amorphous configuration and the cells form a diffraction grating 50, the surface mode supported by the substrate 10 is then diffracted by said grating 50 and the thermal emission becomes directional in the near field but also in the far field. FIG. 3b shows the thermal emission at 8.5 μm for a thermal source according to the invention, with emission that is:

omnidirectional and very weak in the purely crystalline phase (curve a); and directional and centered on about +50° and −50° in the hybrid phase (curve b).

When there is an insulating layer 15 between the MIT substrate and the external layer, the thickness of said layer is chosen to be small relative to the attenuation length of the surface mode (i.e. the mode that exists at the substrate/insulator interface); the surface mode then penetrates partway into the insulator and is diffracted by the grating 50 of the external layer 20.

Preferably, the substrate 10 is made of material able to support a surface mode at the interface with the external layer 20 or with the insulator 15, this being the case for MITs or $SiO_2$. If this is not the case, the substrate supports an evanescent field that will also be diffracted by the grating, but then the emission will be very weakly directional.

The grating may be obtained differently depending on whether all the cells are controllable or not.

In the case where all the cells are controllable 51, the grating is obtained by controlling certain cells to their amorphous state and others to a crystalline state, depending on the required diffraction grating.

According to one variant, certain cells 53 are not controllable and remain in an insulating and therefore crystalline state 11 if it is a question of cells of MIT material; the grating is obtained by controlling certain other cells (these cells therefore belonging to the controllable group 51) or even all of these controllable cells to their amorphous state. The latter case is illustrated in:

FIGS. 4a and 4b for a one-dimensional periodic grating 50 in the plane xy, these figure showing:

(for I=0) all the cells (both the controllable cells 51 and uncontrollable cells 53) in their crystalline state 11 and thus not forming a diffraction grating (FIG. 4a); and (for I=$I_0$) the controllable cells 51 in their amorphous state 11' and the uncontrollable cells 53 in their crystalline state 11, thereby together forming a diffraction grating (FIG. 4b); and FIG. 4c for a two-dimensional periodic grating 50 in the plane xy, this figure showing (for I=$I_0$) the controllable cells 51 in their amorphous state and the uncontrollable cells 53 in their crystalline state, the controllable and uncontrollable cells together forming a diffraction grating.

As has been seen, the means for controlling the MIT cells 51 may be electrical. These means comprise electrodes 52 connected to a generator of an electrical current that is optionally pulsed, for example about every one hundred ns to one μs, in order to make the MIT cells rapidly switchable. The cells 51 require only a low electrical power, for example lower than a few tens of $mW/cm^2$, thereby making it possible to achieve useful power/total power ratios of much lower than 10% for the source.

The cells 51 may be controlled groupwise, the number of cells per group possibly optionally varying from one group to another; the cells may even be controlled individually, this corresponding to the case of a single cell per group. In FIGS. 4a to 4c, the cells 51, which take the form of furrows (1D grating in the plane xy) or form a chequerboard pattern (2D grating in the plane xy), are controlled individually.

The emission direction of the source depends on the period and dimensions of the diffraction grating 50, as shown by the formula:

$$K_m = (2\pi/\lambda)\sin\theta + m2\pi/P$$

where $K_m$ is the parallel component of the diffracted wave of order m, θ the angle of emission and P the period of the grating.

It is possible to control the cells so as to choose the period of the grating, this period being a multiple of the period of the cells.

By changing the period P of the grating, the emission direction of the source is then modulated as may be seen from the emissivity curves (curves a, b and c) corresponding to the gratings in FIGS. 5a, 5b and 5c, respectively, and as shown in FIG. 5d for one wavelength. The period and/or dimensions of the grating are therefore set depending on the desired direction.

For this purpose, the means for controlling the cells 51 are advantageously supervised by supervising means, in order to allow, on request or automatically, these cells 51 to be actively modified depending on the spatial characteristics desired for the diffraction grating 50 formed by the cells, and especially its desired periods (or optionally period if it has only one) and/or its desired dimensions, as illustrated in FIG. 5a for example. If P is the period in the direction Ox of the grating in FIG. 5a, there being two cells per period, one cell of which (in two) is intended to be amorphous, the gratings in FIGS. 5b and 5c have a new period $P_{grating}$=2P with 4 cells per period, two cells of which (in 4) are intended to be amorphous in the grating in FIG. 5b, and one cell of which (in 4) is intended to be amorphous in the grating in FIG. 5c. For example, Pgrating=4.565 μm for P=2.282 μm.

To avoid the need for the electrical switching device and the need to address the cells that this embodiment implies, another embodiment of the invention, described with regard to FIG. 6, allows the grating to be formed more spontaneously on the device scale. In this other embodiment, the external layer 20 comprises:

a uniform external layer 22 made of said metal insulator transition material, said layer being uniform in that it is not patterned with grooves or etched; and a subjacent layer 21 having a thermal conductivity that is spatially modulated depending on the pattern of the cells to be obtained in the external underlayer 22. It is typically a question of a layer of Si the surface of which has been thermally oxidized through a mask, and therefore with spatial selectivity, so as to allow zones of $SiO_2$ of much lower thermal conductivity to be defined; it will be recalled that the thermal conductivity of silicon is about 130 W/° K/m whereas that of silica is about 1.4 W/K/m, i.e. about a factor of 100 lower. The thermal conductivity of this underlayer 21 is controlled by electrical means. Preferably, as indicated above, this thermally conductive underlayer consists of a material supporting a surface mode at its interface with the external underlayer.

The substrate 13 is typically a thermally conductive Si substrate, in order to allow excess heat to be removed from the thermal layer by conduction.

The cells are then formed thermally via this high-thermal-conductivity layer. Specifically, since this thermally conductive underlayer comprises spatial zones 21a intended to become hotter than others 21b under the action of a horizontal flux of electrical current that is initially uniform, the transition takes place first for the least cooled and best insulated zones, thereby increasing their electrical conductivity, so that lines of flux form in the external layer 22, above the well thermally insulated hot zones 21a, and thus cells analogous to those of the preceding embodiment are produced. This thermally conductive underlayer 21 also controls the cells; in this case it is a question of device-scale control.

Whatever its embodiment, this source is not a wire source but rather a planar or almost planar source, i.e. a source with a radius of curvature that is large relative to its thickness. Its area is determined depending on the period of the grating; it must typically comprise at least ten periods. Thus, for an IR source centered on 10 µm and for a 1D grating of 4.5 µm period, its area is larger than 0.5×0.5 mm².

As regards fields of application of this type of source, mention may be made of:
- domestic heating systems, or more generally systems for managing heat flows;
- thermal control of industrial processes (chemistry, adhesive bonding, etc.);
- the food-processing field (ovens, drying, freeze-drying etc.);
- the IR spectroscopy used to analyze gases; and
- stealthy IR sources.

The invention claimed is:

1. A source of directional radiation in an IR band, comprising at least a substrate and an external layer comprising controllable cells made of a metal insulator transition (MIT) material that changes phase depending on its temperature relative to a temperature Tc at which the corresponding wavelength is located in the IR band and that possesses a crystalline phase and an amorphous phase, and control means for controlling the phase change of the cells so as to form in said external layer a diffraction grating when the cells are controlled to the amorphous phase, to control an emission direction of the source in order to obtain a switchable directional source.

2. The radiation source as claimed in claim 1, wherein the diffraction grating is periodic.

3. The radiation source as claimed in claim 1, wherein the control means are electrical.

4. The radiation source as claimed in claim 1, wherein the control means are able to control groups of cells, each group comprising a variable number of cells.

5. The radiation source as claimed in claim 1, configured to modify the spatial characteristics of the diffraction grating, and thus to obtain a switchable directional source the emission direction of which may be modulated.

6. The radiation source as claimed in claim 1, wherein the substrate is made of a material able to support a surface mode.

7. The radiation source as claimed in claim 1, wherein the controllable cells are bounded by a thermal and electrical insulator.

8. The radiation source as claimed in claim 7, wherein the thermal and electrical insulator is a layer of $SiO_2$.

9. The radiation source as claimed in claim 7, wherein the substrate is made of the same MIT material as that of the external layer.

10. The radiation source as claimed in claim 1, wherein the control means comprises a generator of electrical pulses.

11. The radiation source as claimed in claim 1, wherein the external layer comprising the controllable cells comprises a uniform external layer made of said metal insulator transition material and a subjacent underlayer of spatially variable thermal conductivity intended to form said cells in the external underlayer depending on said spatial variation, and the control means is further configured for collectively controlling the cells, wherein the control means consist of a single thermal or electrical control that results in modulated thermal heating through the intervention of the underlayer of spatially variable thermal conductivity.

12. The radiation source as claimed in claim 1, wherein the metal insulator transition material belongs to the group consisting of vanadium oxides or barium titanates or lanthanum perovskites.

* * * * *